United States Patent Office 3,475,192
Patented Oct. 28, 1969

3,475,192
METHOD OF COATING SUBSTRATE WITH METALLIC FLUORIDE FILMS
Robert C. Langley, Millington, N.J., assignor to Engelhard Industries, Inc., Newark, N.J., a corporation of Delaware
No Drawing. Filed Sept. 27, 1966, Ser. No. 582,253
Int. Cl. B29d 11/00; C03c 25/02; B44d 1/12
U.S. Cl. 117—33.3
7 Claims

ABSTRACT OF THE DISCLOSURE

Thin metallic fluoride films are prepared by coating a substrate with a solution comprising a metallic fluoride, a polar organic solvent capable of solubilizing the metallic fluoride, and a film forming vehicle, said film forming vehicle being compatible with the polar organic solvent, and heating the coated substrate to a temperature of 100°–1000° C.

---

This invention relates to a process and composition for preparing metallic fluoride films or coatings. More particularly, it is concerned with a method for applying such fluoride films from novel organic solutions. Still more particularly, the invention is directed to application of metallic fluoride films from solutions comprising the fluoride, suitable solvent and a film forming vehicle.

Substrates have been coated with fluorides for various purposes. It is known, for instance, to coat optical elements such as glass lenses with magnesium fluoride for the purpose of protecting the surface, lowering surface reflectivity, improving image quality and increasing light transmittal. Such magnesium fluoride film is useful as a low reflectance coating because of its hard and adhesive characteristics as well as its desirable optical properties. Low reflectance optical elements such as lenses may comprise multiple coatings so as to avoid color imbalance. For example, it has been suggested that use be made of layers of refractory oxides such as lanthanum oxide or cerium oxide and a metal fluoride such as magnesium fluoride to impart the desired optical properties to a system.

Metallic fluoride films are also useful in the preparation of protective coatings where optical properties are of no concern. They may be used, for instance, to prevent corrosion to containers for fluorine gas, or hydrofluoric acid. It will be appreciated that the film or coating used principally for corrosion protection may be considerably thicker than that used for its desirable optical characteristics. Thickness tolerance in preparation of protective coatings may also be much less strictly controlled.

Metallic fluoride films have been placed on substrates by various methods. Vapor deposition has become the most widely used and commonly practiced method. However, such method has certain disadvantages which limit its application in many situations. Application of fluorine film by vapor deposition processes is carred out at very high, difficult-to-work-with temperatures, e.g., in the order of about 1400° C. for magnesium fluoride and calcium fluoride coatings. It requires special equipment for use in the obtaining of a vacuum of about $10^{-6}$ mm. of mercury. Further, the size and shape of the substrate as well as its composition are limited. Film purity is also a significant problem.

Metallic films have also been formed from organic solutions in the past. These solutions contained organometallics or complexes which, after application to the substrate, were decomposed in air to provide the desired coating. Significantly, this known method has been found entirely inadequate and unworkable for coating substrate with metallic fluoride films. It has been found, for instance, that magnesium fluoride would not combine with known complexing agents so as to form a complex or organometallic for use in film forming. Nor could other readily decomposable compounds soluble in suitable vehicles be prepared which would provide the metal fluoride films with which this invention is concerned.

It is an object of the present invention to provide a method for preparing metallic fluoride films. It is a further object to provide means for forming metallic fluoride coatings from organic solutions comprising the fluoride, solvent therefor, and a film forming vehicle. A further object is provision of a composition and process for coating lenses with magnesium fluoride or calcium fluoride so as to provide lenses with improved reflectance characteristics. Still another object is provision of means for coating optical members with magnesium fluoride and calcium fluoride without special equipment and without subjecting them to temperatures greater than about 1000° C. Other objects will be apparent from the following descriptions of the invention.

According to the present invention, it has now been found that metallic fluoride films are produced from novel organic solutions containing film forming vehicle and fluoride salts, particularly alkaline earth metal fluorides such as calcium fluoride and magnesium fluoride, by depositing the novel solution on a substrate and subjecting the film formed to heat. When it is desired to form coated low reflectance lenses, film thicknesses are prepared of about $\frac{1}{32}$–$\frac{1}{4}$ of a wave length of ultra-violet, visible or infrared light. These are usually in the order of about 0.01 micron to about 0.4 micron since the light energy normally encountered has wavelengths of from about 0.4–1.5 microns.

Because of its index of refraction of 1.38 and its durability and hardness, magnesium fluoride is the preferred metallic fluoride for use in coating optical elements such as lenses, prisms and the like.

In accordance with the process of this invention, metal fluorides are initially dissolved in polar organic solvent. In addition to the basic requirements that the solvent be capable of solubilizing the metallic fluoride to an appreciable degree and that it be compatible with the film forming vehicle used, it is also required that the solvent be stable up to its boiling point. Since it is convenient to dissolve the fluoride in solvent by refluxing, it is preferred that the solvent have a high boiling point thereby permitting greater amounts of fluoride to enter solution. As illustrations of some of the polar organic solvents useful according to this invention, there may be mentioned formamide, substituted formamides such as dimethylformamide (DWF) and the like, dihydric alcohols such as ethylene glycol and the like, substituted benzenes such as benzonitrile, nitrobenzene and the like, dimethylsulfoxide (DMSO), decahydronaphthalene, tetrahydrofuran, bis-(2-methoxyethyl)ether, epichlorohydrin and the like, or mixtures thereof.

Typical formulations or solutions may contain about 0.01–20 or greater weight percent of the metallic fluoride. However, as will be appreciated by persons familiar with this art, the amount of metallic fluoride to be used in the formulations of this invention will vary, depending largely upon the amount of fluoride that can be solubilized in the polar organic solvent or mixture of solvents which are used. Since the required thickness of film is often not very great, rather dilute solutions of the fluorides are normally perfectly satisfactory in obtaining the desired coating.

As has been earlier mentioned, in addition to solvent for the metal fluorides, the novel compositions of this invention also comprise a suitable film forming vehicle, i.e., one compatible and soluble with the solvent and metal fluoride at the operating temperatures. This film forming vehicle may be a single material or it may be a mixture of two or more of the materials hereafter disclosed. Use of a single vehicle tends to be less desirable than a combination of vehicles since it would not ordinarily promote the deposit of a satisfactory film on the substrate. Essential oils are particularly suitable for use as film forming vehicle as they are inherently mixtures of components having a range of boiling points. The choice of the particular organic film forming vehicle utilized controls the behavior of the composition before firing and is dictated by the method by which the composition is to be applied. In addition to simple solvents, the vehicle may include essential oils, terpenes, resins or mixtures thereof, and the like, carefully chosen to impart specific physical properties to the composition. These properties, such as oiliness, viscosity, evaporation rate, surface tension and tack, will vary for different methods of application, such as brushing, spraying, stamping, and the like.

Typical vehicles include mixtures of two or more of the following ingredients: ketones such as for instance methyl ethyl ketone and cyclohexanone, esters such as ethyl acetate, amyl acetate, benzyl acetate, butyl oxalate, dibutyl itaconate, benzyl benzoate, dibutyl phthalate and butyl carbitol acetate, and the like, ethers such as dioxane, and the like, Cellosolve and dipentene oxide, alcohols, for instance butanol and cyclohexanol, hydrocarbons and halo- and nitro-substituted hydrocarbons such as toluene, xylene, petroleum ether, mineral spirits, chloroform, carbon tetrachloride and nitrobenzene. Other typical vehicles include aliphatic acids such as myristic acid, oleic acid and stearic acid, amides, for instance the primary amides of higher fatty acids, terpenes such as pinene and terpineol, essential oils such as oils of lavender, rosemary, aniseed, sassafras, wintergreen, fennel, pine, peppermint, eucalyptus and turpentine, Venetian turpentine, various rosins and balsams, sulfurized terpenes and rosins, hydrogented rosin methyl ester, and synthetic resins. The temperatures of the firing will remove or drive off the rosin synthetic resin or other film forming vehicle to leave the metallic fluoride film.

As will be known to those skilled in the art, natural oils, such as camphor and turpentine, wet glassy surfaces much better than do petroleum derivatives such as toluene, xylene and the like. Moreover, the use of an additive such as rosin, which forms as an amorphous solid upon evaporation of the liquid portion of the vehicle, contributes to the obtaining of a smooth and continuous film after firing. Natural oils also contribute to this in that they are gradually removed from the films over a boiling range as temperature is increased. By way of illustration, useful formulations in accordance with this invention are therefore made up of the following ingredients:

(A)

| | Grams |
|---|---|
| 2% by weight of $MgF_2$ in DMF | 1.55 |
| Rosin dissolved in oil of turpentine (50 weight percent rosin) | 1.62 |
| Oil of camphor | 3.00 |
| | 6.17 |

(B)

| | |
|---|---|
| 1.5% by weight of $CaF_2$ in ethylene glycol | 2.0 |
| Rosin | 1.0 |
| Oil of sassafras | 1.5 |
| Methyl ethyl ketone | 1.5 |
| | 6.0 |

(C)

| | |
|---|---|
| 1.85% by weight of $MgF_2$ in DMSO | 2.4 |
| Petroleum ether | 1.0 |
| Pinene | 2.2 |
| Oil of lavender | 0.8 |
| Chloroform | 1.9 |
| | 8.3 |

The organic solutions prepared according to this invention are heated or fired to produce the desired durable metallic fluoride films. Such firing may be performed at temperatures of from 100°–1000° C., most preferably at 400°–800° C. The solution may be applied and fired in air since this is normally readily accomplished using ordinary equipment. However, the air present during the firing should be free of dust and dirt to avoid unwanted deposition on the substrate. This is particularly important when lenses are being coated according to this procedure.

The substrate upon which the film is deposited may be metal, ceramic, organic, glass, quartz or other material and is preferably of smooth and clean surface and capable of withstanding temperatures of at least about 100° C.

The following example is presented for the purpose of illustration and not by way of limitation.

Magnesium fluoride (1.0 g.) is stirred at gentle reflux in 11.2 g. of technical grade dimethylformamide (DMF). After about 15 minutes, the turbid solution changes to a deep tan color. The solution is refluxed for an hour, cooled and filtered. About 0.76 g. of solids remain undissolved indicating that 0.24 g. of magnesium fluoride is in solution.

This solution (1.55 g.) is added to 1.62 g. of a 50% weight percent rosin solution containing equal amounts of oil of rosemary, Hexalin and toluene, and 3 g. of oil of camphor. The resulting solution, slightly turbid and yellow in color, is applied to a glass slide and fired at 500° C. in air for 30 minutes. A thin, transparent film of magnesium fluoride results. Electron-micrographs at magnifications of 5600 and 15,000 and 134,000 show that the film is continuous. Bragg spacings obtained from electron diffraction patterns of the film show that the film is $MgF_2$, substantially free of other phases.

It should be understood that although this invention has been described with reference to particular embodiments thereof, changes and modifications may be made which are within its intended scope.

What is claimed is:
1. A method for coating a substrate with a metallic fluoride film, which comprises applying to the substrate an organic solution consisting essentially of a metallic fluoride in the amount of about 0.01 to 20 or greater weight percent, a polar organic solvent capable of solubilizing the metallic fluoride, and a film forming vehicle, said film forming vehicle being compatible with the polar organic solvent, and heating said solution to a temperature of 100°–1000° C. to thereby remove said solvent and film forming vehicle and deposit a metallic fluoride film on said substrate.

2. A method according to claim 1 wherein the metallic fluoride is magnesium fluoride or calcium fluoride.

3. A method according to claim 2 wherein substrate is an optical member and the coating has a thickness of ¼–1/32 wavelength of ultraviolet, visible or infrared light.

4. A method according to claim 2 wherein the solution is heated to a temperature of 400–800° C.

5. A method according to claim 2 wherein the polar organic solvent comprises formamide, dimethylformamide, ethylene glycol, benzonitrile, nitrobenzene, dimethylsulfoxide, decahydronaphthalene, tetrahydrofuran, bis(2-methoxyethyl)ether or epichlorohydrin, or mixtures thereof.

6. A method according to claim 5 wherein the polar organic solvent is dimethylformamide.

7. A method according to claim 5 wherein the substrate is an optical member having one or multiple refractory oxide coatings.

References Cited

UNITED STATES PATENTS

| | | | |
|---|---|---|---|
| 2,536,764 | 1/1951 | Moulton | 117—169 X |
| 2,561,077 | 7/1951 | Tilton | 117—169 X |
| 2,601,123 | 6/1952 | Moulton | 117—169 X |
| 2,668,478 | 2/1954 | Schroder | 117—33.3 X |
| 2,706,691 | 4/1955 | Schaefer | 117—169 X |
| 3,023,119 | 2/1962 | Anderson et al. | 117—169 X |
| 3,035,318 | 5/1962 | Campbell | 117—127 X |

WILLIAM D. MARTIN, Primary Examiner

MATHEW R. P. PERRONE, JR., Assistant Examiner

U.S. Cl. X.R.

106—236; 117—69, 123, 124, 127, 169